(12) United States Patent
Petracca et al.

(10) Patent No.: US 10,140,202 B1
(45) Date of Patent: Nov. 27, 2018

(54) SOURCE CODE ANNOTATION FOR A SYSTEM ON CHIP

(71) Applicant: Cadence Design Systems, Inc., San Jose, CA (US)

(72) Inventors: Michele Petracca, Chappaqua, NY (US); Yosinori Watanabe, Lafayette, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/711,993

(22) Filed: Sep. 21, 2017

(51) Int. Cl.
*H03M 1/00* (2006.01)
*G06F 11/36* (2006.01)
*G06F 8/30* (2018.01)

(52) U.S. Cl.
CPC ............ *G06F 11/3624* (2013.01); *G06F 8/30* (2013.01)

(58) Field of Classification Search
CPC ........ G06F 11/3624; G06F 8/30; G06F 11/36; G06F 9/44; H03M 1/66; H03M 1/68; H03M 2201/814
USPC ............................................. 341/136, 50, 51
See application file for complete search history.

(56) References Cited

U.S. PATENT DOCUMENTS

| | | | | |
|---|---|---|---|---|
| 7,702,499 | B1 * | 4/2010 | Lavagno | G06F 11/3612 703/27 |
| 9,495,223 | B2 * | 11/2016 | Ebcioglu | G06F 17/5045 |
| 2008/0127116 | A1 * | 5/2008 | Kosche | G06F 11/328 717/130 |
| 2010/0153654 | A1 * | 6/2010 | Vorbach | G06F 12/0862 711/137 |

* cited by examiner

*Primary Examiner* — Jean B Jeanglaude
(74) *Attorney, Agent, or Firm* — McDermott Will & Emery LLP

(57) ABSTRACT

A method including receiving source code for controlling a system on a chip and correlating a datum and an instruction in the source code with a first node is provided. The method includes associating the first node with a resource used by the datum and the instruction, based on a model for the system on a chip, illustrating a link between the first node and a second node, indicative of a data dependency in the source code between the first node and the second node, and evaluating a performance of the system on a chip controlled by the source code. Also including forming an annotated source code based on the performance of the system on a chip. A system and a non-transitory, computer-readable medium including instructions to perform the method are also provided.

20 Claims, 17 Drawing Sheets

SOURCE CODE ANNOTATION FOR A SYSTEM ON CHIP

TECHNICAL FIELD

Embodiments described herein are generally related to the field of design and fabrication of system on chip (SoC) devices. More specifically, embodiments described herein are related to methods for analyzing and providing source code used as firmware in SoC control.

BACKGROUND

Current integrated circuit (IC) design is largely dedicated to large systems integrating software and hardware to perform multiple tasks simultaneously, or almost simultaneously. Some of these designs include SoC configurations, typically designed to execute different applications that compete for system resources (e.g., memory, processor time, and bus bandwidth). The large number of operating parameters to consider imposes severe constraints to the software (SW) used for hardware control in the SoC. While the SW may include many parallelized instructions, the more steps included in the SW, the more likely it will be to have redundancies and other undesirable resource sinks embedded in the SW structure. In such circumstances, it is desirable to have a tool that systematically and exhaustively explores the SW structure to provide an optimized source code that improves SoC performance.

The description provided in the background section should not be assumed to be prior art merely because it is mentioned in or associated with the background section. The background section may include information that describes one or more aspects of the subject technology.

SUMMARY

In certain aspects, a computer-implemented method as disclosed herein includes receiving source code for controlling a system on a chip, correlating a datum and an instruction in the source code with a first node, and associating the first node with a resource used by the datum and the instruction, based on a model for the system on a chip. The computer-implemented method also includes illustrating, in a display, a link between the first node and a second node, the link being indicative of a data dependency in the source code between the first node and the second node, evaluating a performance of the system on a chip controlled by the source code, and forming an annotated source code based on the performance of the system on a chip.

In certain aspects, a system is described. The system includes a memory storing instructions, and at least one processor that executes the instructions to receive a source code for controlling a system on a chip, correlate a datum and an instruction in the source code with a first node, and associate the first node with a resource used by the datum and the instruction, based on a model for the system on a chip. The at least one processor also executes the instructions to illustrate, in a display, a link between the first node and a second node, the link being indicative of a data dependency in the source code between the first node and the second node, evaluate a performance of the system on a chip controlled by the source code, and form an annotated source code based on the performance of the system on a chip.

In certain aspects, a non-transitory, machine-readable storage medium is described that includes machine-readable instructions for causing a processor to execute a method. The method includes receiving a source code for controlling a system on a chip, correlating a datum and an instruction in the source code with a first node, and associating the first node with a resource used by the datum and the instruction, based on a model for the system on a chip. The method also includes illustrating, in a display, a link between the first node and a second node, the link being indicative of a data dependency in the source code between the first node and the second node, evaluating a performance of the system on a chip controlled by the source code, and forming an annotated source code based on the performance of the system on a chip.

In certain aspects, a system is described including a means for storing instructions. The system further includes a means to execute the instructions to receive a source code for controlling a system on a chip, correlate a datum and an instruction in the source code with a first node, and associate the first node with a resource used by the datum and the instruction, based on a model for the system on a chip. The means to execute the instructions also executes the instructions to illustrate, in a display, a link between the first node and a second node, the link being indicative of a data dependency in the source code between the first node and the second node, evaluate a performance of the system on a chip controlled by the source code, and form an annotated source code based on the performance of the system on a chip.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

Figure 1:
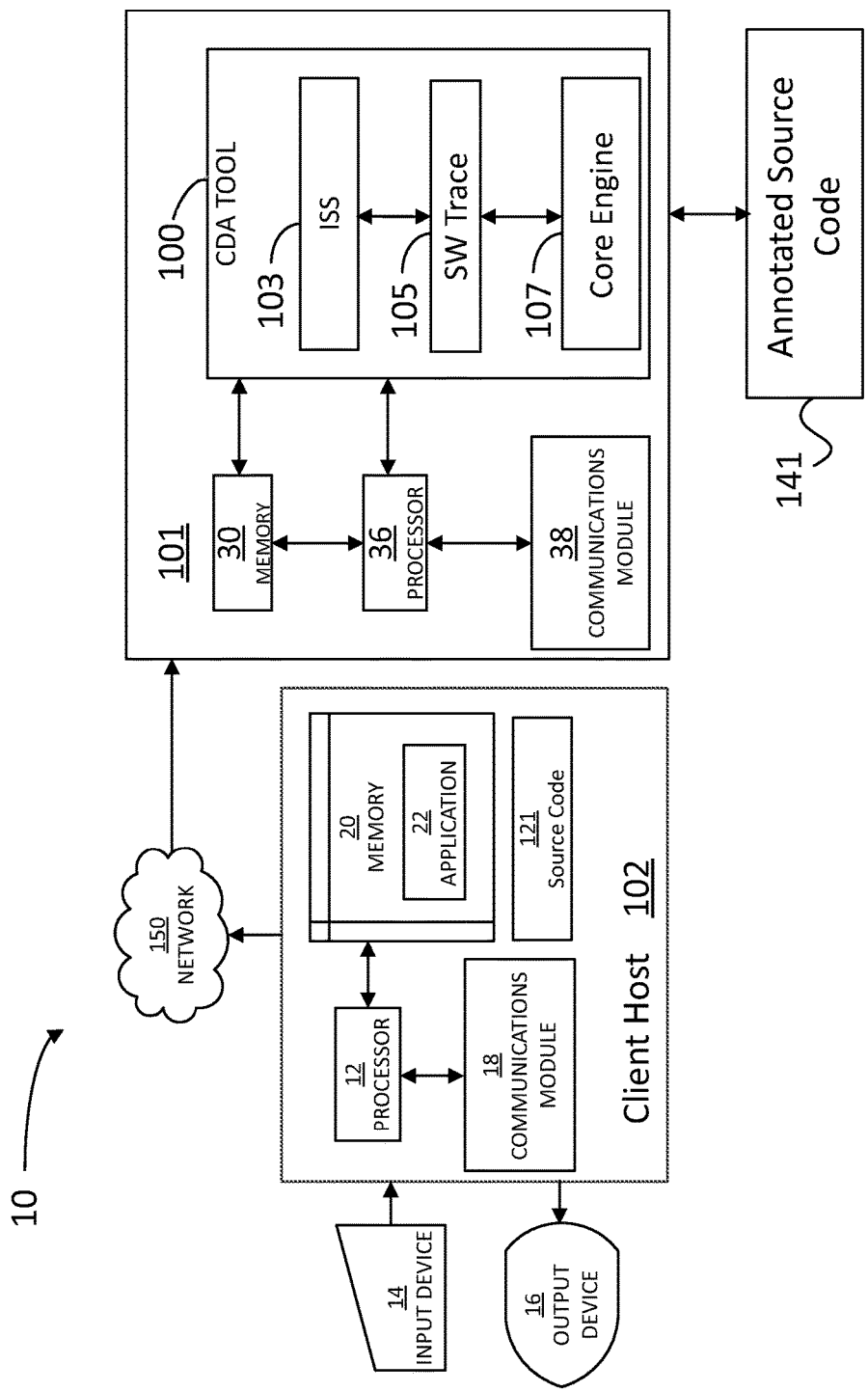
FIG. 1 illustrates a system configured to annotate source code for a SoC, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Embodiments disclosed herein include a CDA tool that allows a designer to optimize source code used for controlling a SoC in terms of the consumption of one or more system resources. In some embodiments, the CDA tool may incorporate environmental parameters including physical properties such as power, voltage and temperature (PVT) of the SoC, or user-related properties such as rate of use (e.g., data traffic, network conditions, and the like), and type of application. SoC designers make use of multiple input blocks including memories, processors, and the like, e.g., "external devices and software." External devices and software may be provided by multiple vendors and have device parameters that can be adjusted by the designer when assembling the multiple devices into a SoC. During assembly, in some embodiments the designer may use an application that configures the parameters for the different IPs to study the performance of the SoC to identify device parameters that may be changed, and how.

In some embodiments, and without limitation, a CDA tool as disclosed herein includes a software parameter for a SoC, such as logic commands, in addition to hardware properties (e.g., a compiler parameter). Compiler parameters may determine the type of executable program that runs the SoC, which may impact its performance. In some embodiments, a software parameter for a SoC may include a specific algorithm implementation to achieve the same result (e.g., the same type of hardware control or data processing). Further, in some embodiments software parameters may include different constants to, for instance, change the degree of accuracy, the precision, the amount of buffering, or the number of processes or threads in an application. In some embodiments, software parameters for a SoC may involve a tradeoff between speed, power requirements, resource footprint, signal-to-noise ratios, and the like, which the designer may desire to evaluate in detail. Further, software parameters for a SoC in embodiments consistent with the present disclosure may include a selection of whether to run an algorithm on a computer processing unit (CPU), or in a graphics processing unit (GPU). In this regard, the designer may desire to evaluate trade-offs between power requirements, performance, and complexity by selecting between CPU and GPU execution.

The disclosed system addresses a technical problem tied to computer technology and arising in the realm of computer simulation of hardware, namely the technical problem of accurately analyzing the performance of a source code for controlling a SoC that includes multiple device and software parameters. The disclosed system solves this technical problem by including a CDA tool that analyzes a source code and provides an annotated source code that the user may test and compare with the original source code in terms of a resource consumption.

Example System Architecture

FIG. 1 illustrates a system 10 configured to perform a statistical sensitivity analysis for a SoC, according to some embodiments. A client host 102 includes a processor 12 configured to execute instructions stored in a memory 20. Memory 20 may include an application 22, which includes commands that when executed by processor 12 cause client host 102 to perform methods consistent with the present disclosure. Application 22 may include a runtime software program running on client host 102 to issue commands to control a CDA tool 100 in server 101. For example, application 22 may include an application to control CDA tool 100 for a source code 121. Source code 121 may include a register transfer level (RTL) compiler language (e.g., an ASIC RTL file) configured to handle hardware and software that controls the hardware in a SoC. Client host 102 may also include a communications module 18 that enables client host 102 to transfer data, provide commands and receive instructions from CDA tool 100 through a network 150. Client host 102 may be coupled with an input device 14 (e.g., a mouse, a keyboard, a touch screen display, and the like) and with output device 16 (e.g., a display, a speaker, and the like). Accordingly, a user of client host 102 may enter commands and queries to client host 102 with input device 14, and receive graphic and other information from client host 102 via output device 16. In some embodiments application 22 may control input device 14 and output device 16 through a graphic user interface (GUI), enabling a user to have access to CDA tool 100 and perform the SSA analysis on source code 121.

Server 101 may include a memory 30, a processor 36, and a communications module 38 to transfer data, receive commands and provide instructions from client host 102 through network 150. Memory 30 and processor 36 are coupled with CDA tool 100, which may include an instructions set simulator (ISS) 103, a Software (SW) trace analyzer 105, and a core engine 107. In some embodiments, CDA tool 100 provides an annotated source code 141, which may be used thereafter to control a SoC.

Figure 2:
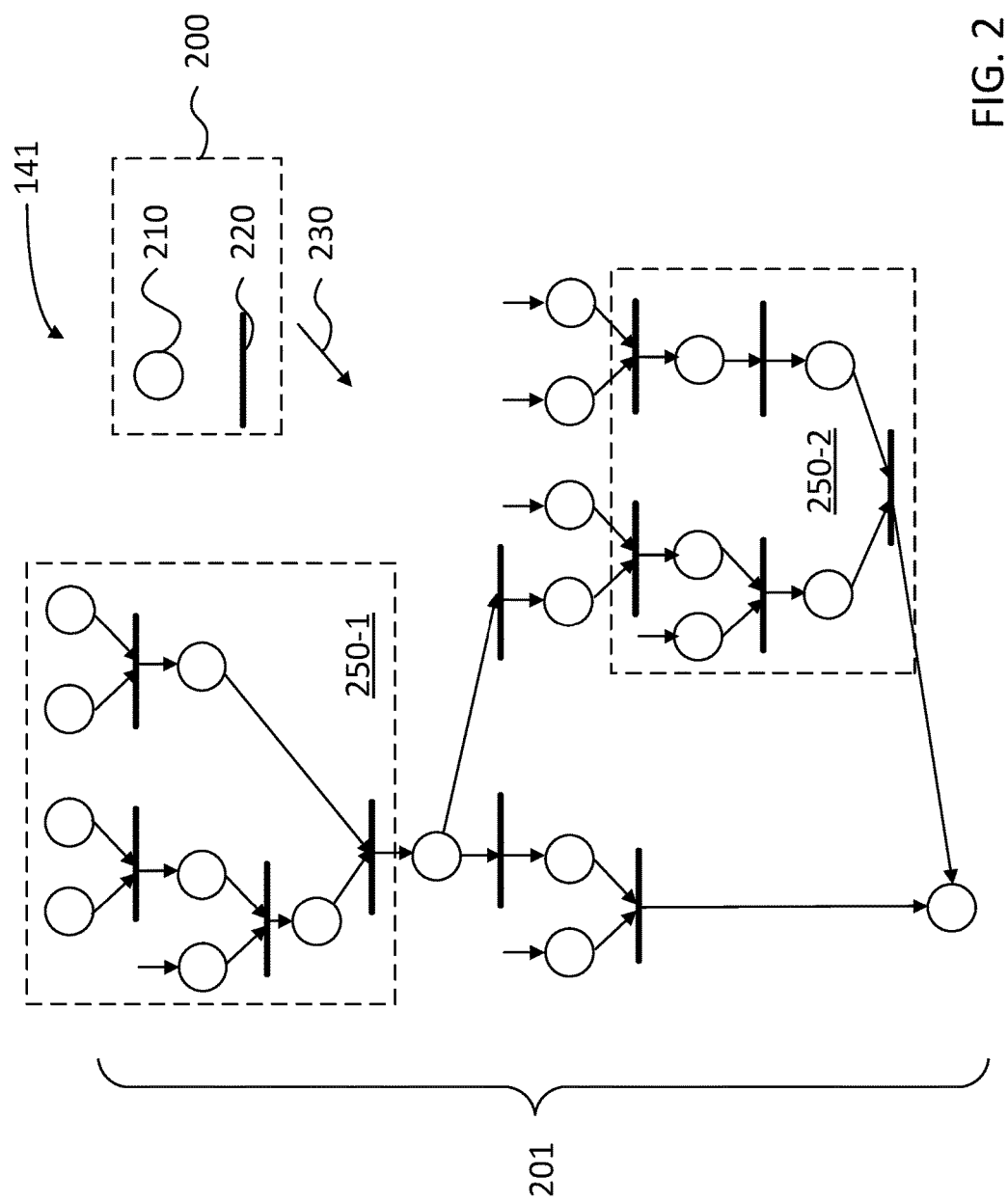
FIG. 2 illustrates a block diagram of an annotated source code for a SoC provided by a computer dataflow analyzer (CDA) tool, according to some embodiments.

FIG. 2 illustrates a block diagram of an annotated source code 141 for a SoC provided by CDA tool 100, according to some embodiments. A plurality of nodes 200 are arranged in a map 201. Each of the nodes 200 includes at least a datum 210, and an instruction 220. In some embodiments, a node 200 may include one or more data 210, such as when instruction 220 includes an operation of two values, e.g., a multiplication, a sum, and the like. Datum 210 may be stored in a register within processor 36, or in memory 30 accessible by processor 36. A plurality of links 230 couple a first node 200 with a second node 200.

Depending on certain evaluation conditions determined by the specific configuration of the SoC (e.g., as given by controllable parameters, environmental parameters, and observable parameters) one or more functions 250-1 and 250-2 may be defined in map 201, aggregating multiple nodes 200 within its boundaries. The boundaries of functions 250 are determined by dataflow conditions identified by CDA tool 100 (e.g., a common input datum 210 or a common output datum 210). In some embodiments, annotated source code 141 may include detailed information (e.g., input and output dataflow) collected at the boundaries of functions 250. Further, in some embodiments, annotated source code 141 may include a time annotation at the function level only, for a quick analysis. In yet other embodiments, annotated source code 141 may include a time annotation at the function level and at the node level, in some instances.

Each of the nodes 200 in map 201 may be annotated with a resource associated to datum 210 and instruction 220. The resource may include, for example, a time stamp indicating a completion of instruction 220 in node 200. The time stamp may be determined by CDA tool 100 by applying a delay model of instructions 220, rather than a time stamp of a clock in processor 36 when executing a simulation of the SoC (including a compiled version of source code 121). Technically, a user may annotate nodes 200 in source code 121 with any resource associated to the node, such as power, voltage, number of resources, bandwidth, data access time (e.g., the time it takes for datum 210 to be available in node 200 for execution of the instruction 220) and other parameter values of the SoC. Accordingly, CDA tool 100 may access different models for the operation of the SoC, each model providing an accurate assessment of a given resource used in each node 200.

In some embodiments, the usage and allocation of resources in each node 200 may depend on environmental parameters of the SoC operation combined with controllable parameters desired by a user or envisioned by the designer of the SoC.

FIGS. 3A-3F illustrate graphs 300A-300F (hereinafter, collectively referred to as "graphs 300") showing different annotation stages of a source code 301 for a SoC provided by CDA tool 100, according to some embodiments. Graphs 300 include multiple nodes 200 and links 230, only a few of which are depicted, for clarity purposes.

A compiled, C++ version of source code 301 is illustrated in Table I below, indicating different command lines. Table I is an example of an input to a CDA tool as disclosed herein, and represents a generic piece of software. The use of C++ language in Table I is for illustrative purposes. Without limitation, any program written in any language for which an executable can be generated for ISS 103 may be implemented. Further, line numbering and other language features that provide no information may be omitted, in some embodiments.

TABLE I

```
#include <stdio.h>
#include <assert.h>
#include <stdlib.h>
#include <string.h>
  int f(int a) {
         return a + 5;
  }
  int g(int a) {
         return a + 3;
  }
  int x(int a) {
         return a - 2;
  }
  int main(int argc, char **argv)
  {
  int i;
  int array [2];
  int val = 20;
  int acc = Ø;
  array[Ø] = f(val);
  array[1] = g(val);
  for (i=Ø; i<2; i++) {
         acc += x(array[i]);
  }
  return acc;
   }
```

Figure 3A:
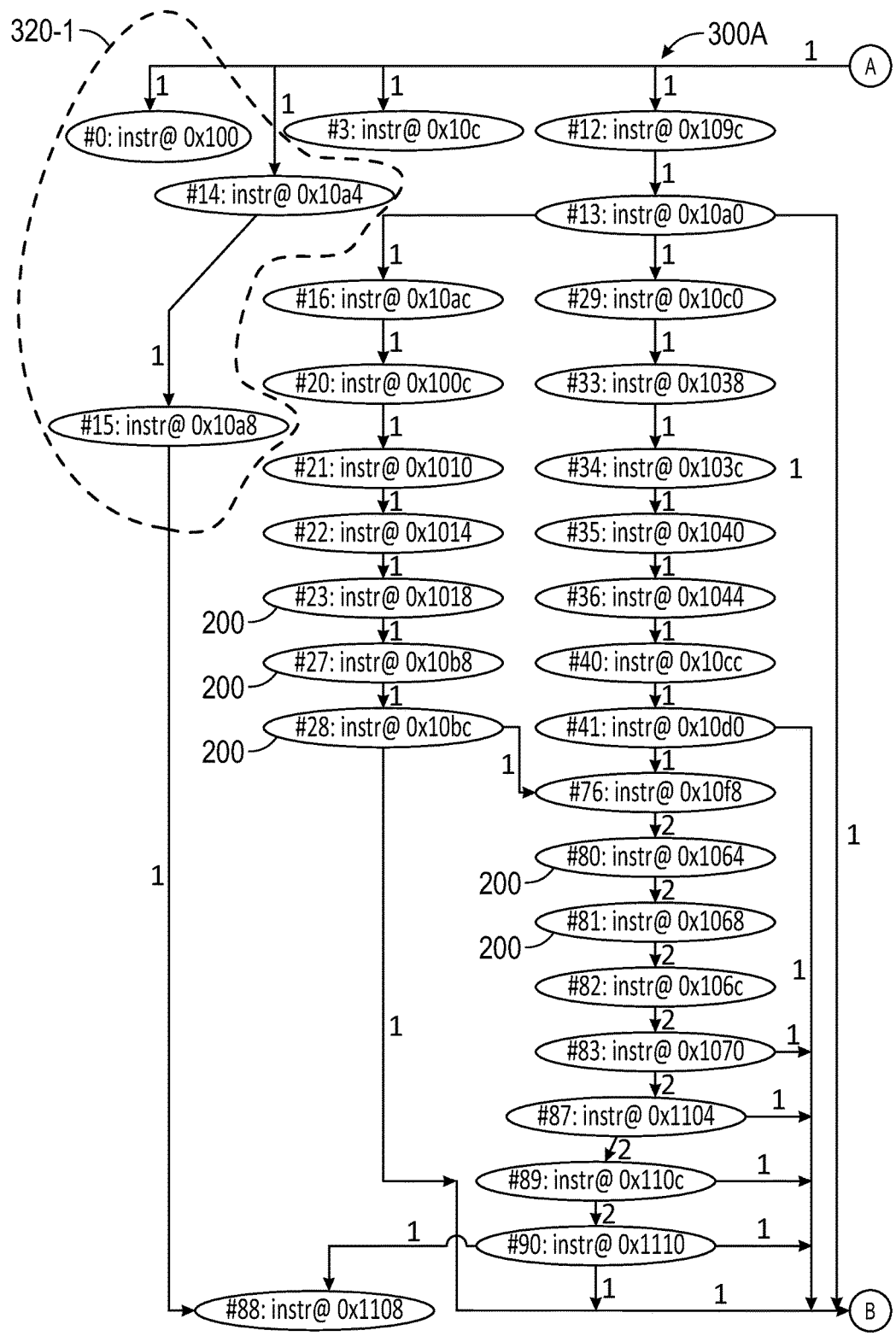
FIGS. 3A-3F illustrate graphs showing different annotation stages of a source code for a SoC provided by a CDA tool, according to some embodiments.
Figure 3A:
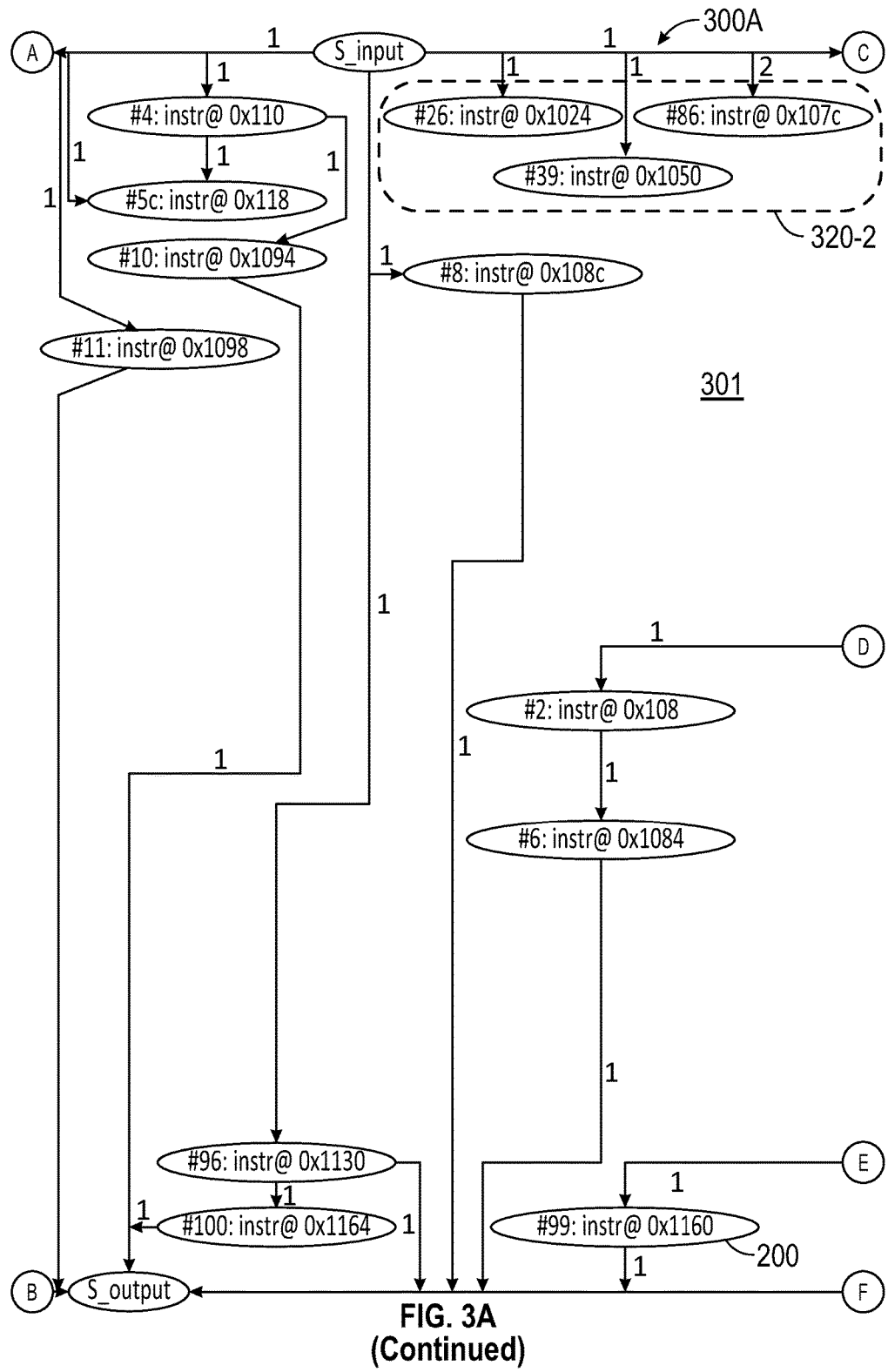
Figure 3A:
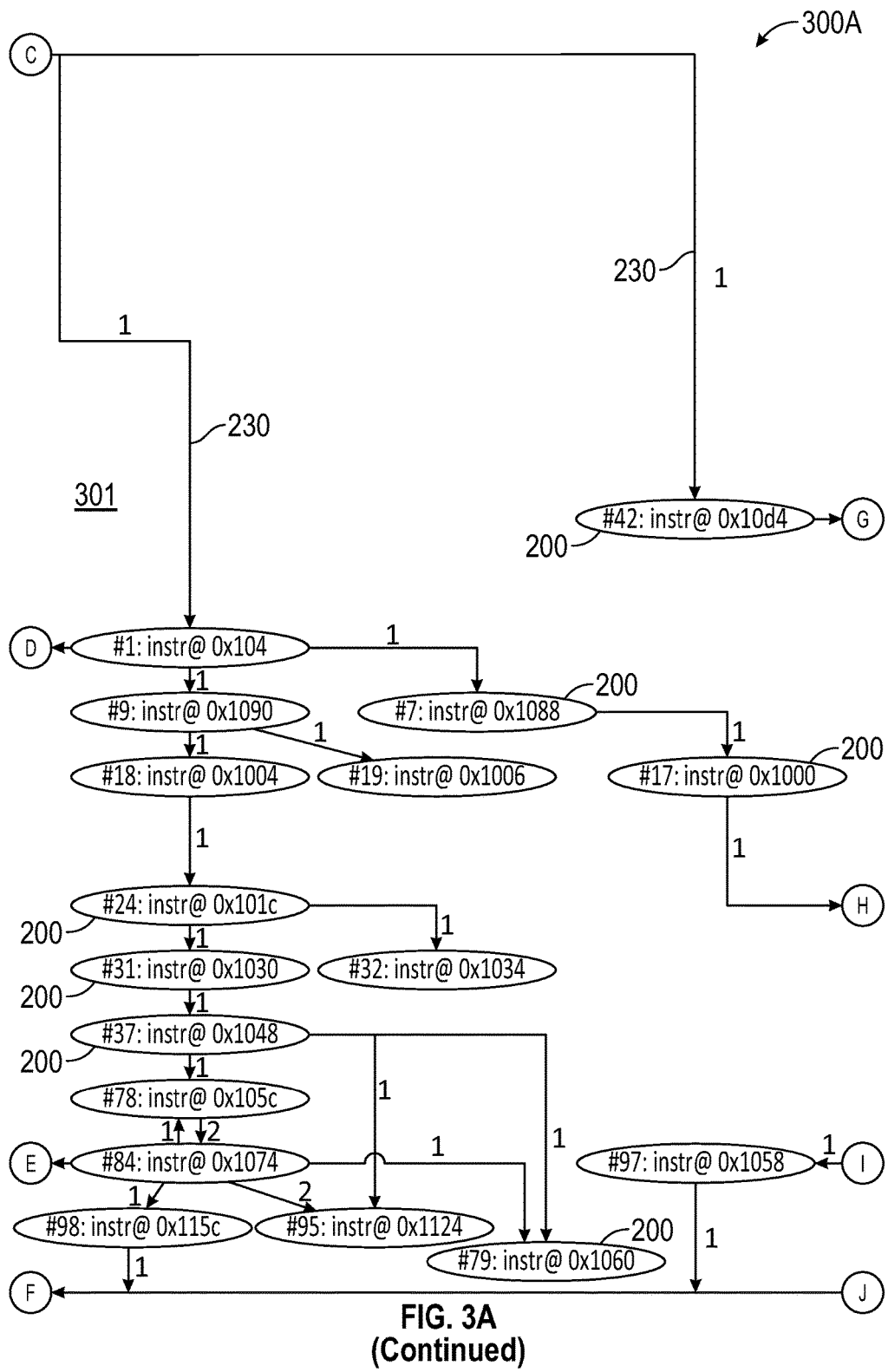
Figure 3A:
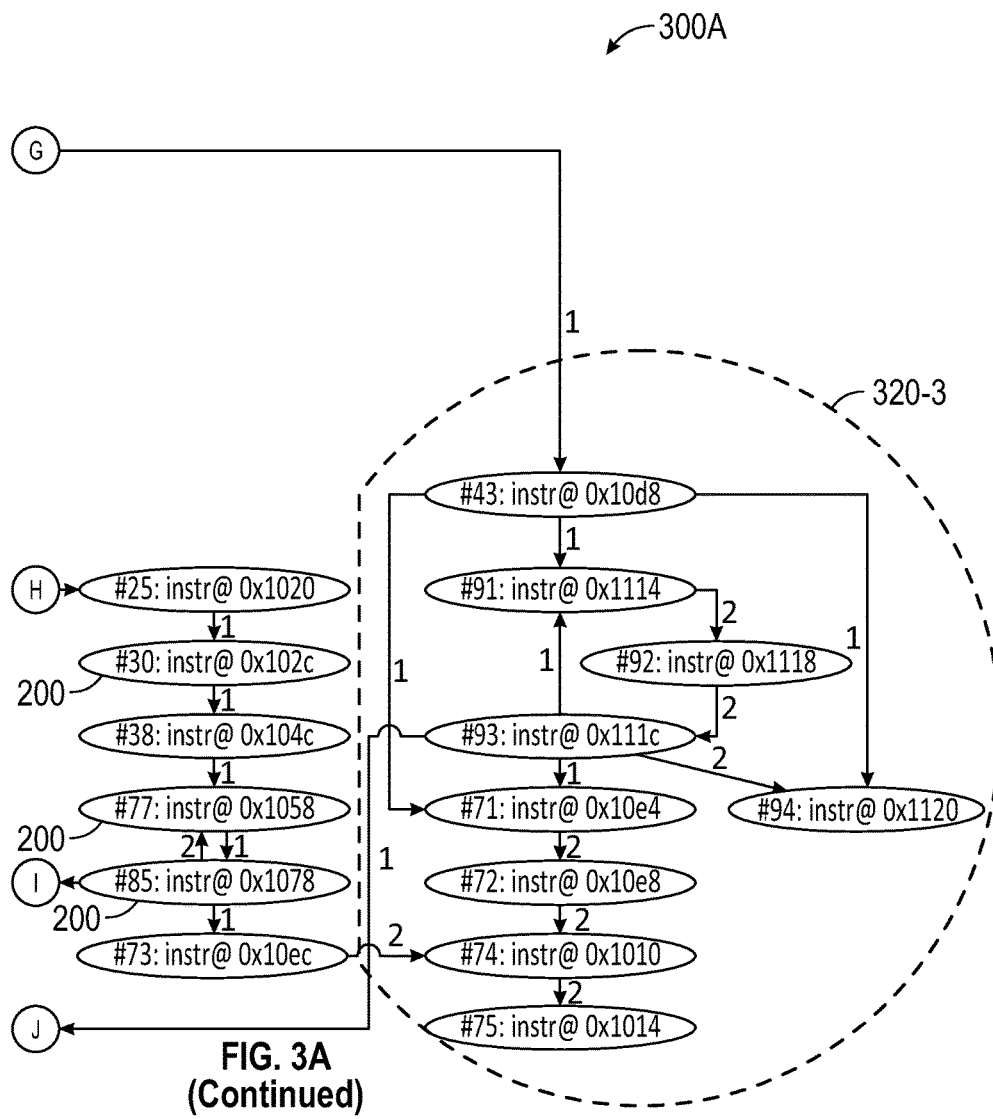
Figure 3B:
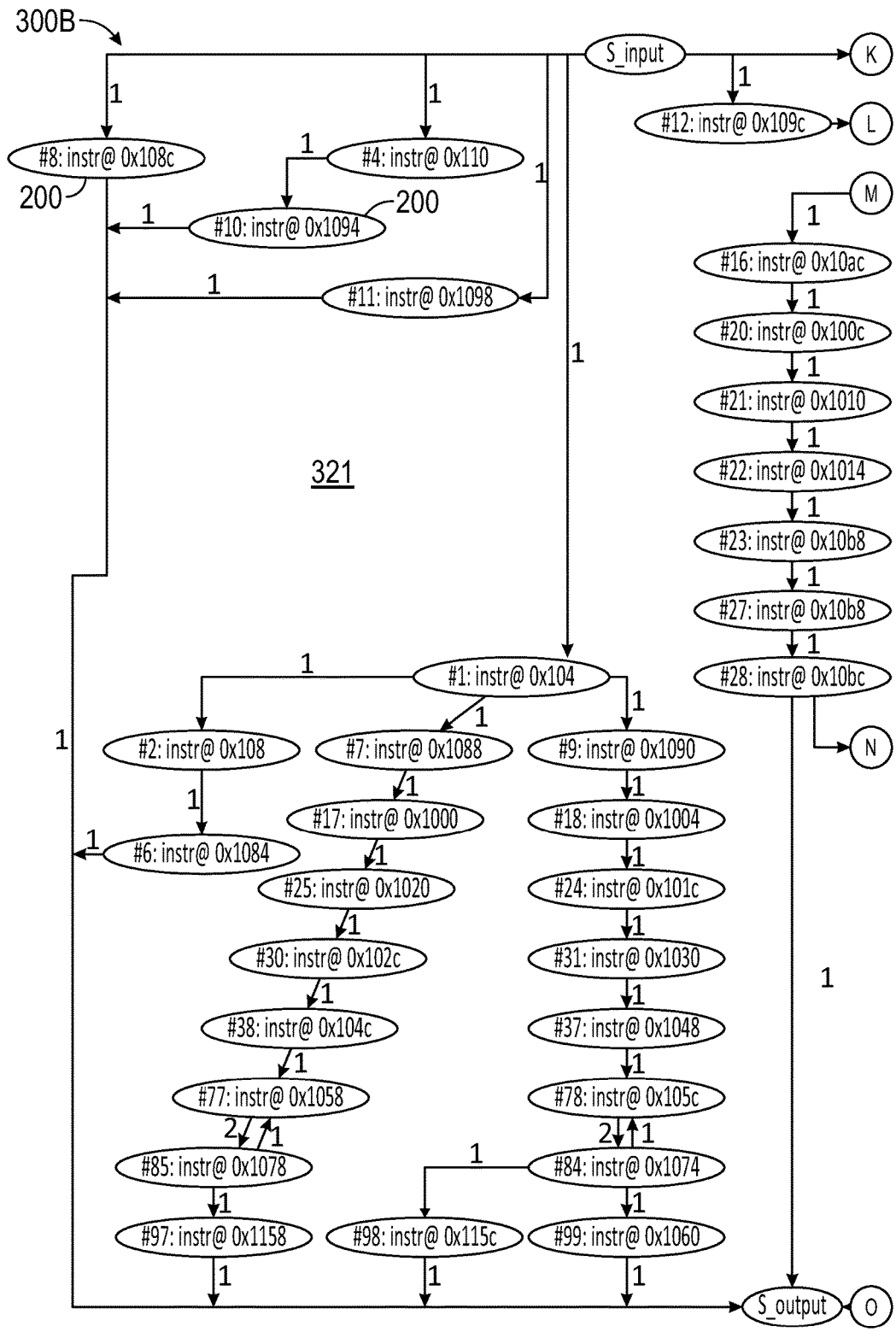
Figure 3B:
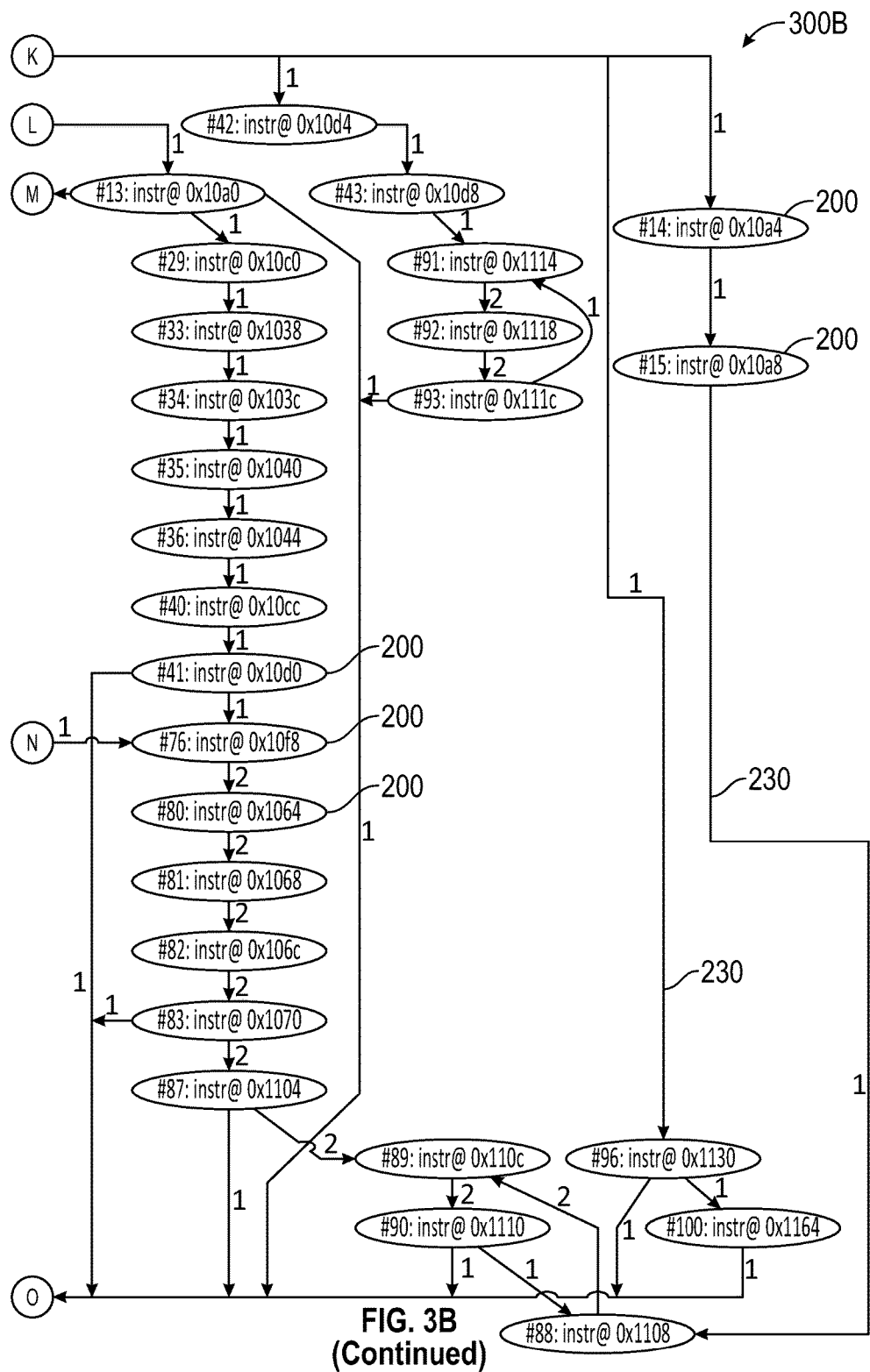

FIG. 3A illustrates graph 300A for the original source code 301, wherein dead branches 320-1, 320-2, and 320-3 (collectively referred to, hereinafter, as "dead branches 320") are identified in original source code 301. FIG. 3B illustrates graph 300B wherein dead branches 320 have been removed from original source code 301 to form annotated source code 321.

Figure 3C:
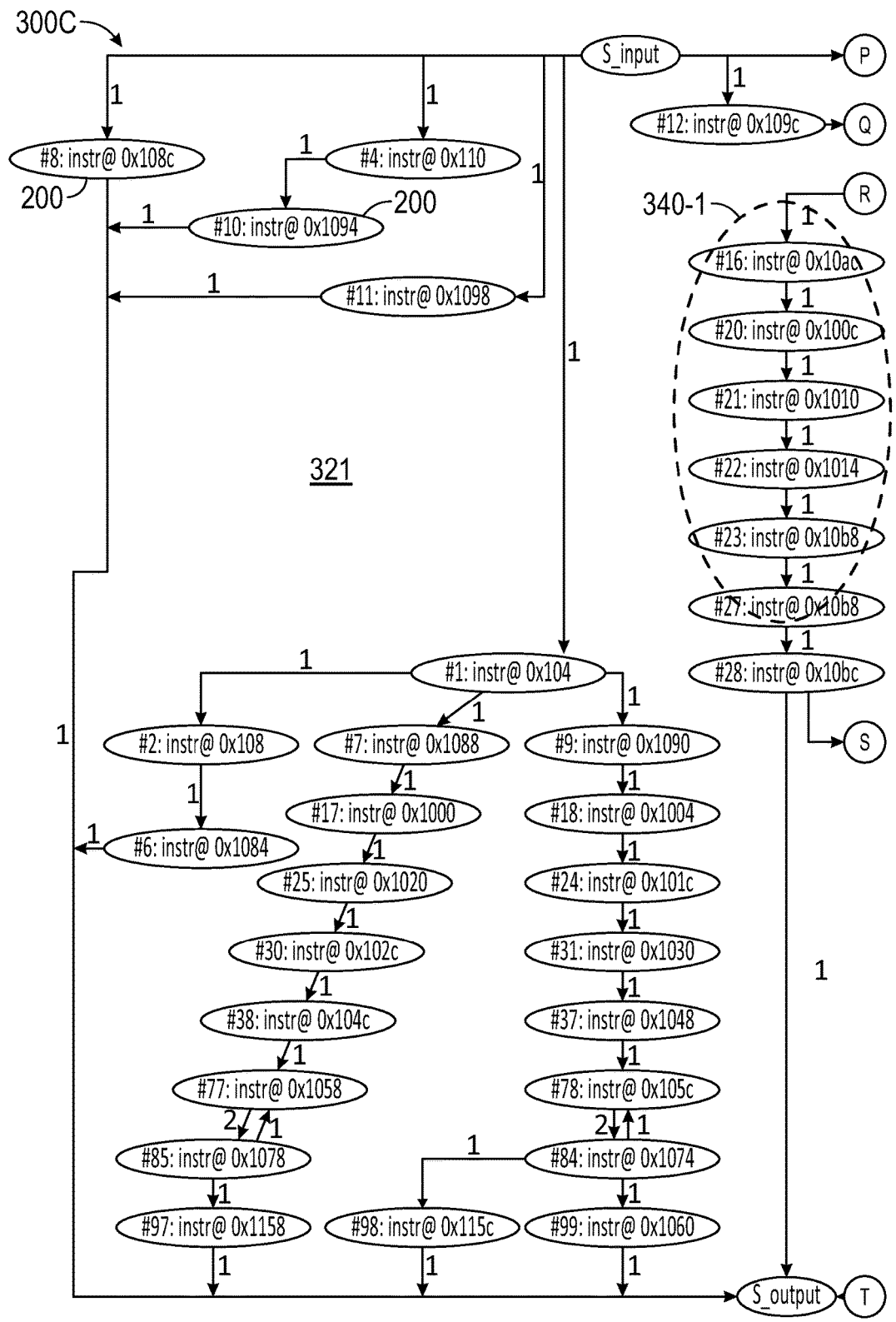
Figure 3C:
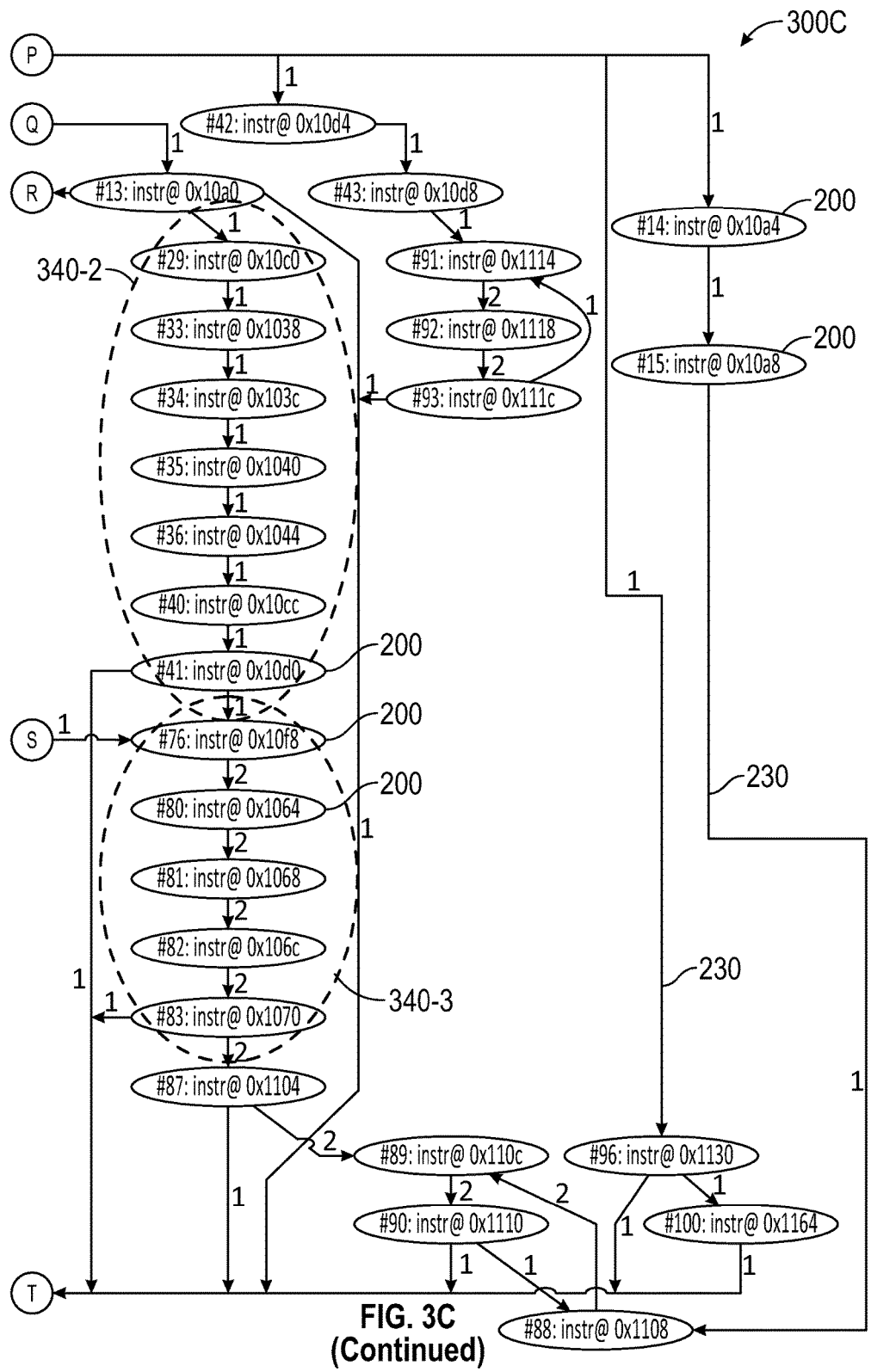
Figure 3D:
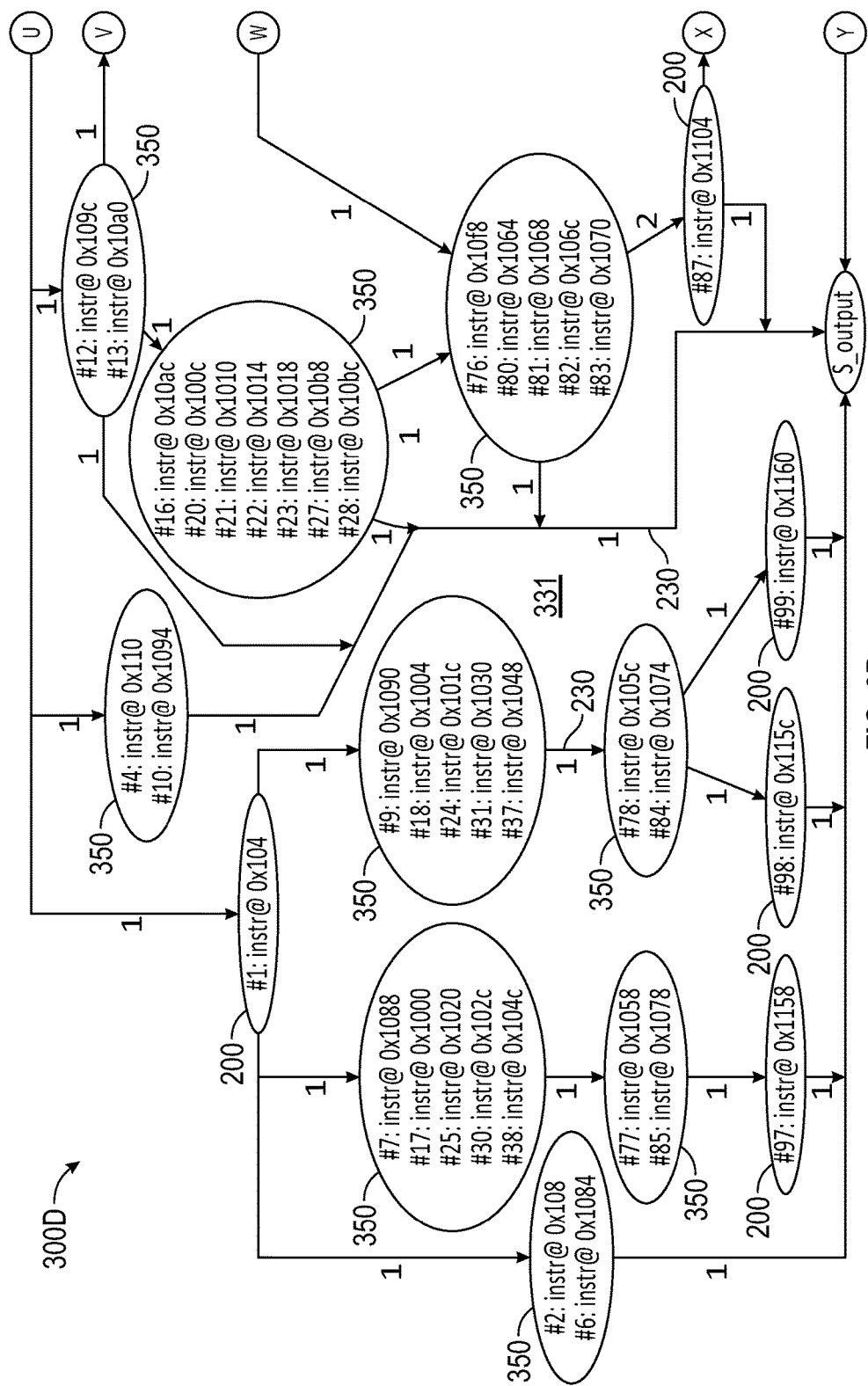
Figure 3D:
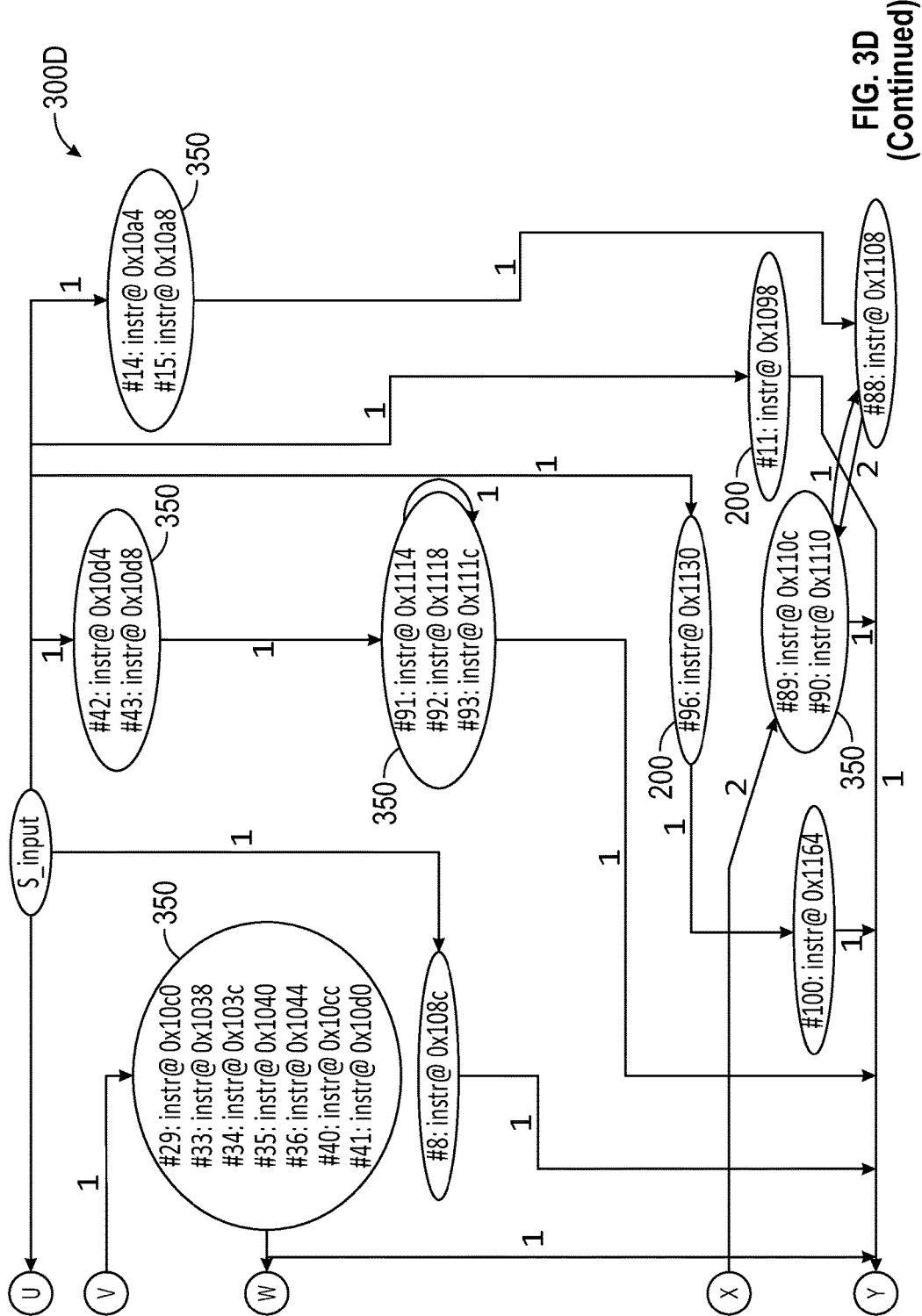

FIG. 3C illustrates graph 300C wherein sequential strings 340-1, 340-2, and 340-3 (collectively referred to, hereinafter, as "sequential strings 340") have been identified in annotated source code 321. FIG. 3D illustrates graph 300D wherein sequential strings 340 have been removed from annotated source code 321 to form annotated source code 331 including functions 350 replacing sequential strings 340.

Figure 3E:
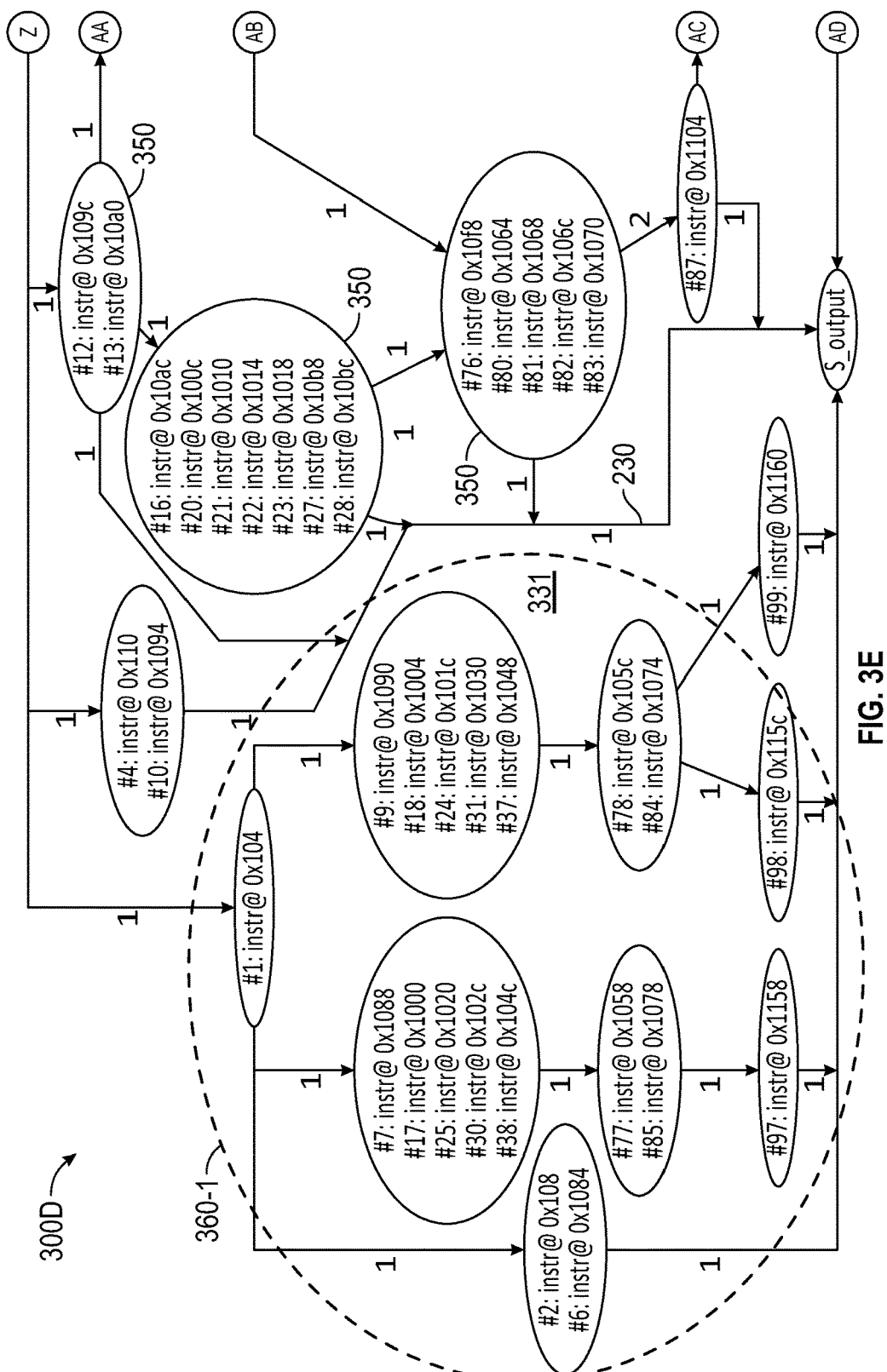
Figure 3E:
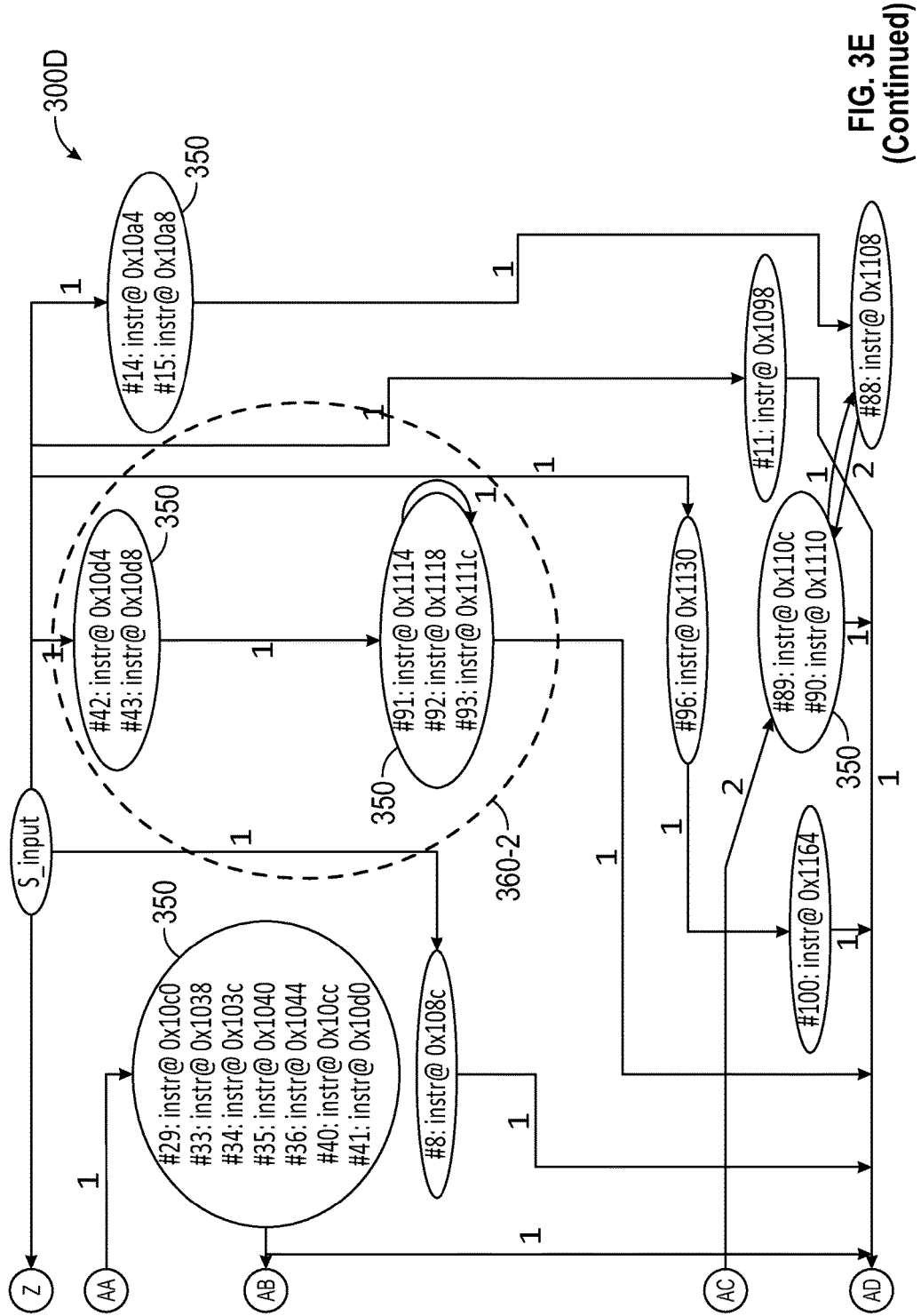

FIG. 3E illustrates graph 300E wherein stack pointer 360-1 and function return address 360-2 (collectively referred to, hereinafter, as "pointers and addresses 360") are identified in annotated source code 331. In some embodiments, for SoC analysis and operation pointers and addresses 360 may add time delay without contributing to the data flow from the input to the output of the source code. Accordingly, it may be desirable to identify such elements of a routine and removed them from the executable code so as to free up more resources in memory 30 and processor 36.

Some of the functions 350 are kept in the map, as they may have an active part in the dataflow.

Figure 3F:
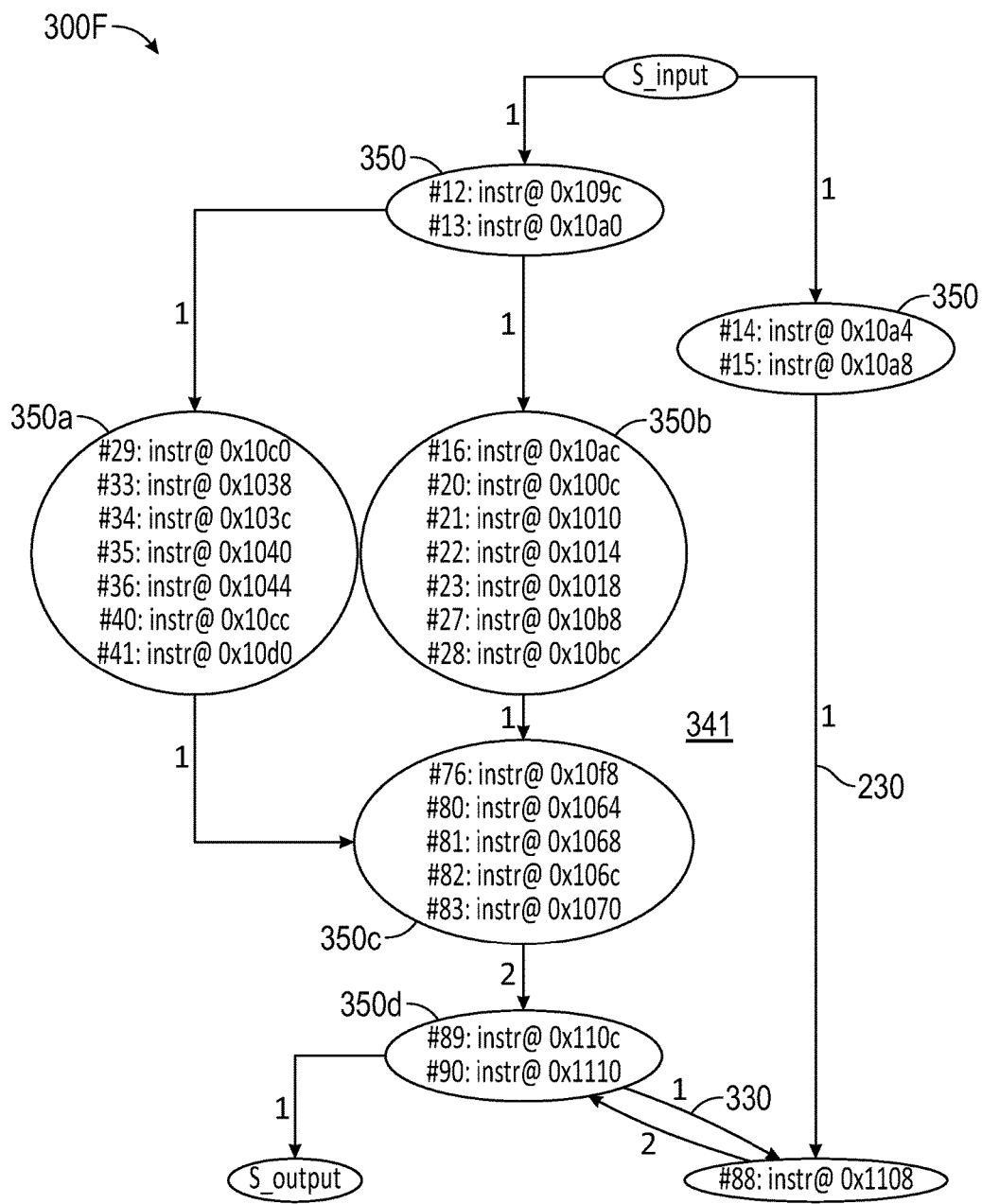

FIG. 3F illustrates graph 300F wherein pointers and addresses 360 have been removed from annotated source code 331 to form annotated source code 341, which maintains at least some functions 350 that may be considered essential for the dataflow. More specifically, functions 350a and 350b may include two functions working on the same dataset (e.g., array[0]=f(val) and array[1]=g(val), cf. Table I). And function 350c may be executed twice (a first time for the dataflow from function 350a, and a second time for the dataflow from function 350b, e.g., x(array[i]), cf. Table I, where i may be '0' or '1'). Further, link 330 may include a loop wherein the same function 350d is executed two times reusing the previous result as in a carry loop dependency (e.g., "for(i=0; i<2; i++)" loop, cf. Table I).

In some embodiments, annotated source code 341 exhibits an intrinsic concurrency and dependency of the different nodes in the dataflow, when the code is executed with the dataset. Further, when the annotated source code 341 may include a time value corresponding to a theoretical earliest execution time. Thus, annotated source code 341 may explicitly indicate critical sections of the code when executed with a given dataset.

The steps illustrated in graphs 300 enable a designer to identify key aspects of source code 121, such as data dependency and concurrency, and criticality (e.g., using timing information to determine higher latency nodes, and the like). In some embodiments, the specific map or "trace" of graphs 300 may be determined by an input dataset (e.g., a configuration of the SoC), and the tool chain used to produce executable code from annotated source code 341. Accordingly, the analysis leading to charts 300 may be repeated with different datasets, different tool chains, and different target processing units.

A partial listing of the C++ compiled version of annotated source code 341 is illustrated in Table II, below, indicating the annotations with bold, underlined text. As in Table I above, the use of C++ language in Table II is for illustrative purposes only. Embodiments consistent with the present disclosure may include any generic software language. Table II includes information that CDA tool 100 collects during execution, which is used to build graphs 300 and links 230. Information in Table II includes data 210 that each instruction 220 uses and produces. The information may include a register address or memory location that instruction 220 reads from, and the register address or memory location instruction 220 writes to. The format in Table II may vary according to user preferences.

TABLE II

```
NOTE: Start simulation
Instruction @ IPC = 0x100 --  opcode =
0x18200000
Input regs are: 0x2
r1
Output regs are: 0x2
r1
Instr: instr
Inputs: r1,
Outputs:
S 00000100: 18200000 1.movhi r1,0
r1      = 00000000  flag: 0
Instruction @ IPC = 0x104 --  opcode =
0x9c207f00
Input regs are: 0x1
r0
Output regs are: 0x2
```

TABLE II-continued

```
    r1
    Instr: instr
    Inputs: r0,
    Outputs:
    S 00000104: 9c207f00 1.addi   r1,r0,0x7f00
    r1        = 00007f00   flag: 0
    ...
    WRITE access to memory address 0x7ef8 from
    register 2 [4 bytes] @ IPC = 0x1084 --
    opcode = 0xd7e117f8
    Instr: instr
    Inputs: r2,
    Outputs:
    Write: mem0x7ef8:4
    S 00001084: d7e117f8 1.sw     -8(r1) ,r2
    [00007ef8] = 00007f00   flag: 0
    ...
    READ access from memory address 0x7eec to
    register 3 [4 bytes] @ IPC = 0x10ac --
    opcode = 0x8462ffec
    Instr: instr
    Inputs:
    Outputs: r3
    Read: mem0x7eec:4
    S 000010ac: 8462ffec 1.1wz   r3,-20(r2)
    r3        = 00000014  flag: 0
```

Figure 4:
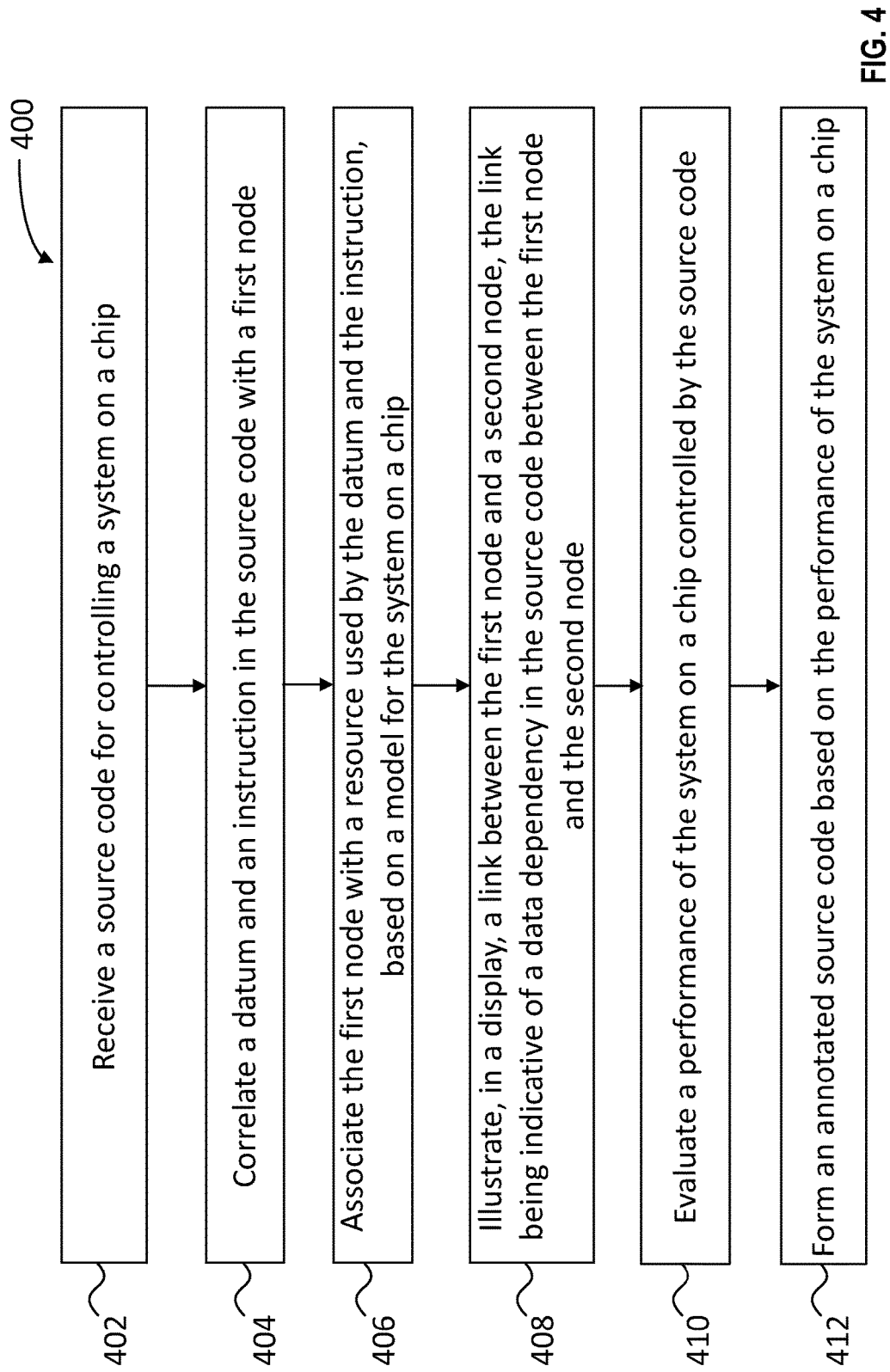
FIG. 4 is a flow chart illustrating steps in a method for annotating source code for a SoC in a trace-driven data flow analyzer, according to some embodiments.

FIG. 4 is a flow chart illustrating steps in a method 400 for annotating source code for a SoC in a trace-driven data flow analyzer (e.g., Source code 121), according to some embodiments. At least some of the steps in method 400 may be performed by a computer having a processor executing commands stored in a memory of the computer (e.g., client host 102 or server 101, processors 12 or 36, and memories 20 or 30). In some embodiments, at least some of the commands may be stored as part of a CDA application installed in a computer (e.g., application 22 in client host 102). Further, steps as disclosed in method 400 may include creating, editing, annotating, and/or storing a source code, and generating an annotated source code (e.g., source code 121 and annotated source code 141). Methods consistent with the present disclosure may include at least some, but not all of the steps illustrated in method 400, performed in a different sequence. Furthermore, methods consistent with the present disclosure may include at least two or more steps as in method 400, performed overlapping in time, or almost simultaneously.

In some embodiments, at least one or more of the steps in method 400 may be performed in a cloud computing environment, wherein a computer may include servers, such as a master server and a slave server. Accordingly, at least some of the steps illustrated in method 400 may be performed in parallel in different processors, following separate computational threads. For example, each of the separate computational threads may be performed by at least one of slave servers in each of multiple applications and processors dedicated to the specific computational thread.

Step 402 includes receiving source code for controlling a SoC. In some embodiments, the source code may include multiple command lines and instructions written in a compiler language (e.g., C++, and the like) that may be compiled into an executable language. In some embodiments. Step 402 includes receiving source code in RTL compiler language.

Step 404 comprises correlating a datum and an instruction in the source code with a first node. In some embodiments, step 404 may include correlating one or more data and an instruction for modifying the one or more data with the first node. For example, in some embodiments step 404 may include correlating an instruction to add a first datum and a second datum to obtain a third datum. In some embodiments, step 404 may include comparing the first datum with the second datum.

Step 406 includes associating the first node with a resource used by the datum and the instruction, based on a model for the SoC. In some embodiments, step 406 includes selecting the resource from one of a power usage, a data access time, a processing time, a desired bandwidth for executing the instruction, and a number of resources called by the instruction, according to the model for the system on a chip. In some embodiments, step 406 includes identifying an environmental condition (e.g., a PVT condition) affecting the resource.

Step 408 includes illustrating, in a display, a link between the first node and a second node, the link being indicative of a data dependency in the source code between the first node and the second node. In some embodiments, step 408 further includes forming a map of the source code based on multiple nodes and multiple links between at least two of the multiple nodes.

Step 410 includes evaluating a performance of the SoC controlled by the source code. In some embodiments, step 410 includes aggregating the resource used by the datum and the instruction for multiple nodes in the source code and determining a total resource consumed by the system on a chip when the source code is executed.

Step 412 includes forming an annotated source code based on the performance of the SoC. In some embodiments, the resource used by the datum and the instruction comprises a delay produced by executing the instruction, and step 412 may include annotating the first node with the delay. In some embodiments, the resource used by the datum and the instruction includes a delay produced by reading the datum from a memory, and step 412 includes annotating the first node with the delay. In some embodiments, step 412 includes aggregating the first node and the second node within a function call when a dataflow boundary comprising the first node and the second node is identified. In some embodiments, step 412 further includes configuring the first node and the second node to be executed in parallel when the data dependency indicates a first dataset for the first node that is independent of a second dataset for the second node. In some embodiments, step 412 includes removing a path that manipulates a stack pointer or a function return address in the source code.

Hardware Overview

Figure 5:
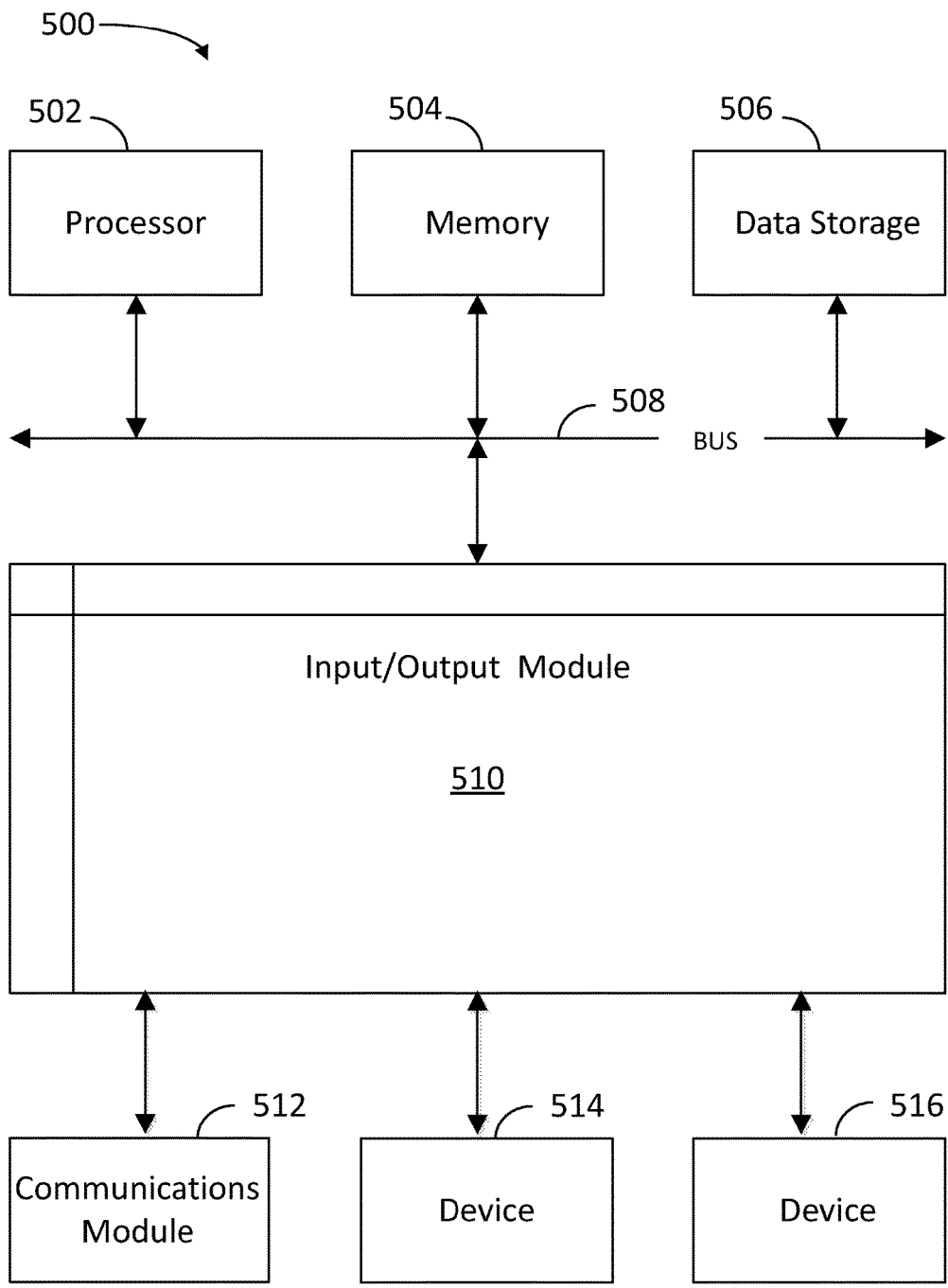
FIG. 5 is a block diagram illustrating an example computer system for annotating source code for a SoC, according to some embodiments.

FIG. 5 is a block diagram illustrating an example computer system 500 with which the methods and steps illustrated in method 400 can be implemented, according to some embodiments. In certain aspects, computer system 500 can be implemented using hardware or a combination of software and hardware, either in a dedicated server, integrated into another entity, or distributed across multiple entities.

Computer system 500 includes a bus 508 or other communication mechanism for communicating information, and a processor 502 coupled with bus 508 for processing information. By way of example, computer system 500 can be implemented with one or more processors 502. Processor 502 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 502 may include modules and circuits configured as a 'placing' tool or engine, or a 'routing' tool or engine, to place devices and route channels in a circuit layout, respectively, and as disclosed herein.

Computer system 500 includes, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. Processor 502 and memory 504 can be supplemented by, or incorporated in, special purpose logic circuitry.

The instructions may be stored in memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions.

Computer system 500 is coupled via input/output module 510 to various devices. The input/output module 510 is any input/output module. Example input/output modules 510 include data ports such as USB ports. The input/output module 510 is configured to connect to a communications module 512. Example communications modules 512 include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

Methods as disclosed herein may be performed by computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein (e.g., as in method 400). One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 includes servers and personal computer devices. A personal computing device and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
   receiving a source code for controlling a system on a chip;
   correlating a datum and an instruction in the source code with a first node;
   associating the first node with a resource used by the datum and the instruction, based on a model for the system on a chip;
   illustrating, in a display, a link between the first node and a second node, the link being indicative of a data dependency in the source code between the first node and the second node;
   evaluating a performance of the system on a chip controlled by the source code; and
   forming an annotated source code based on the performance of the system on a chip.

2. The computer-implemented method of claim 1, further comprising selecting the resource from one of a power usage, a data access time, a processing time, a desired bandwidth for executing the instruction, and a number of resources called by the instruction, according to the model for the system on a chip.

3. The computer-implemented method of claim 1, wherein associating the first node with a resource taken by the datum and the instruction comprises identifying an environmental condition affecting the resource.

4. The computer-implemented method of claim 1, wherein the resource used by the datum and the instruction comprises a delay produced by executing the instruction, and forming an annotated source code comprises annotating the first node with the delay.

5. The computer-implemented method of claim 1, wherein the resource used by the datum and the instruction comprises a delay produced by reading the datum from a memory, and forming an annotated source code comprises annotating the first node with the delay.

6. The computer-implemented method of claim 1, wherein illustrating, in the display, a link between the first node and the second node further comprises forming a map of the source code based on multiple nodes and multiple links between at least two of the nodes.

7. The computer-implemented method of claim 1, wherein evaluating a performance of the system on a chip controlled by the source code comprises aggregating the resource used by the datum and the instruction for multiple nodes in the source code and determining a total resource consumed by the system on a chip when the source code is executed.

8. The computer-implemented method of claim 1, wherein forming an annotated source code based on the performance of the system on a chip comprises aggregating the first node and the second node within a function call when a dataflow boundary comprising the first node and the second node is identified.

9. The computer-implemented method of claim 1, wherein forming an annotated source code based on the performance of the system on a chip comprises configuring the first node and the second node to be executed in parallel when the data dependency indicates a first dataset for the first node that is independent of a second dataset for the second node.

10. The computer-implemented method of claim 1, wherein forming an annotated source code based on the performance of the system on a chip comprises removing a path that manipulates a stack pointer or a function return address in the source code.

11. A system, comprising:
    a memory, storing instructions; and
    at least one processor that executes the instructions to:
    receive a source code for controlling a system on a chip;
    correlate a datum and an instruction in the source code with a first node;
    associate the first node with a resource used by the datum and the instruction, based on a model for the system on a chip;
    illustrate, in a display, a link between the first node and a second node, the link being indicative of a data dependency in the source code between the first node and the second node;
    evaluate a performance of the system on a chip controlled by the source code; and
    form an annotated source code based on the performance of the system on a chip.

12. The system of claim 11, wherein the resource comprises one of a power usage, a data access time, a processing time, a desired bandwidth for executing the instruction, and a number of resources called by the instruction, according to the model for the system on a chip.

13. The system of claim 11, wherein to associate the first node with a resource taken by the datum and the instruction the at least one processor further executes instructions to identify an environmental condition affecting the resource.

14. The system of claim 11, wherein the resource used by the datum and the instruction comprises a delay produced by executing the instruction, and to form an annotated source code the at least one processor further executes instructions to annotate the first node with the delay.

15. The system of claim 11, wherein the resource used by the datum and the instruction comprises a delay produced by reading the datum from a memory, and to form an annotated source code the at least one processor further executes instructions to annotate the first node with the delay.

16. The system of claim 11, wherein to illustrate, in the display, a link between the first node and the second node the at least one processor further executes instructions to form a map of the source code based on multiple nodes and multiple links between at least two of the nodes.

17. The system of claim 11, wherein to evaluate a performance of the system on a chip controlled by the source code the at least one processor further executes instructions to aggregate the resource used by the datum and the instruction for multiple nodes in the source code and to determine a total resource consumed by the system on a chip when the source code is executed.

18. A non-transitory, computer-readable medium comprising instructions stored in a memory which, when executed by a processor cause a computer to perform a method, the method comprising:
receiving a source code for controlling a system on a chip;
correlating a datum and an instruction in the source code with a first node;
associating the first node with a resource used by the datum and the instruction, based on a model for the system on a chip;
illustrating, in a display, a link between the first node and a second node, the link being indicative of a data dependency in the source code between the first node and the second node;
evaluating a performance of the system on a chip controlled by the source code; and
forming an annotated source code based on the performance of the system on a chip.

19. The non-transitory, computer-readable medium of claim 18, wherein the method further comprises selecting the resource from one of a power usage, a data access time, a processing time, and a number of resources called by the instruction, according to the model for the system on a chip.

20. The non-transitory, computer-readable medium of claim 18, wherein the method further comprises associating the first node with a resource taken by the datum and the instruction comprises identifying an environmental condition affecting the resource.

* * * * *